April 4, 1961 B. M. SCHWARTZ 2,978,148
AUTOMATIC FISH FEEDER
Filed Jan. 20, 1958
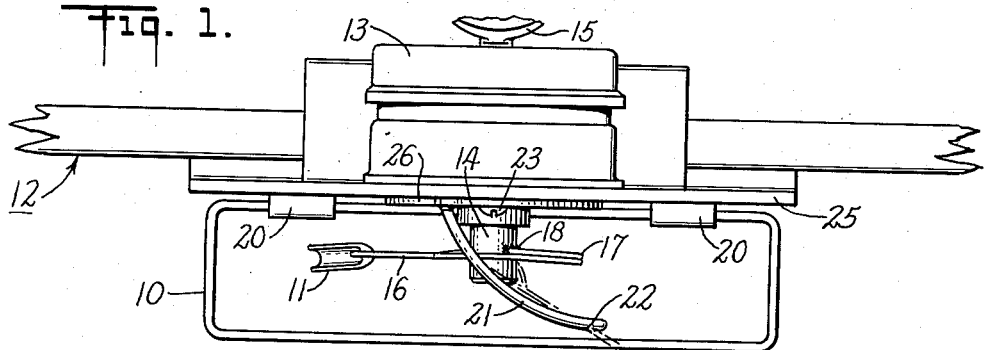
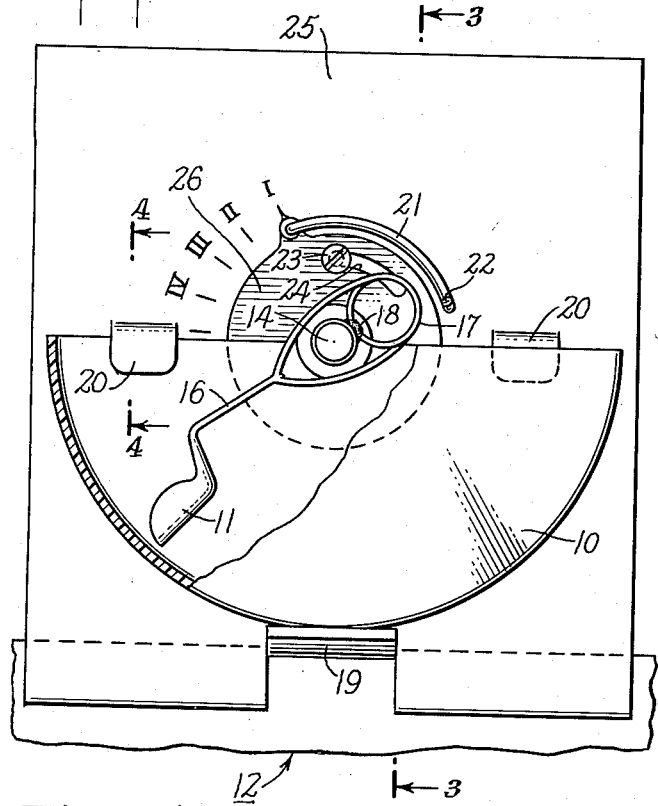
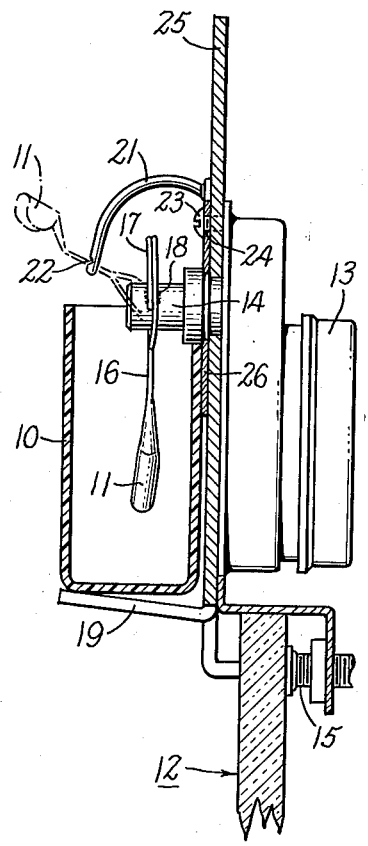
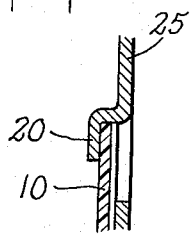
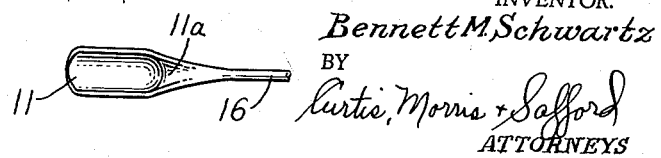
INVENTOR.
Bennett M. Schwartz
BY Curtis, Morris + Safford
ATTORNEYS United States Patent Office 2,978,148
Patented Apr. 4, 1961

2,978,148
AUTOMATIC FISH FEEDER
Bennett M. Schwartz, 106 Kearny Ave., Perth Amboy, N.J.
Filed Jan. 20, 1958, Ser. No. 709,910
8 Claims. (Cl. 222—197)

This invention relates to a fish feeder for the periodic or otherwise controlled supplying of conventional types of food materials to goldfish, tropical fish or the like.

An object of the invention has been to provide an automatically controlled feeding device which will operate in connection with a wide variety of types and sizes of aquariums effectively and reliably in accordance with any desired or necessary feeding schedule so that, over relatively extended periods, no personal attention to this chore is necessary.

It is contemplated that such advantages may be achieved in the use of devices of large as well as small capacity and in feeding different types of food materials in various suitable forms or conditions.

My invention, in general, is embodied in apparatus wherein a food distributor, as a scoop or the like, preferably of small capacity compared to that of a holder for the food supply, is mounted at the free end of a rotatable arm in such manner that when rotated a full turn or through a full cycle, a portion of its path of travel is through the supply of food material in the hopper or holder where it picks up a charge of said material and with continued rotation brings it to a discharge position where the picked up food material is dropped from the scoop outside the holder, usually into an aquarium or the like. The scoop is normally positioned in the plane of its pickup path through the food material supply and when loaded or charged, is intercepted and deflected by a cam or the like against resistance of a spring to a discharge position such that the load or picked up contents are dropped from the scoop outside the holder. It will be advantageous to provide in or in connection with the cam contour an interruption, as a notch, having a shoulder so placed that as the arm rides past the edge thereof it is deflected sharply against a stop, as the opposite side of the notch, thereby jolting the scoop and facilitating the discharge therefrom of the picked up material into an aquarium or the like outside the holder.

Apparatus embodying my invention may also conveniently provide means for adjusting and to that extent controlling the amount of food discharged from the scoop outside the holder or into an aquarium, or the like, so as to meet the various food requirements of different numbers and/or kinds of fish, for example. For this purpose in one embodiment, the deflecting cam may be mounted on an adjustable carrier in such manner that at one end position of adjustment of said carrier, the scoop will be actuated to drop a major portion of its picked up contents back into the holder and retain only a minor residual for discharge into the tank. Under other or opposite extreme conditions such as require maximum food delivery, said carrier is adjusted to its opposite end position, thus causing the scoop to be actuated in a manner to drop into the holder only a minor portion of its picked up charge and to retain the major portion to be dumped outside the holder and into the tank or the like.

One embodiment of my invention in a portable form suitable for use on small home size aquariums, or the like, is shown in the appended drawings wherein:

Figure 1 is a top plan view showing the device attached to the wall of an aquarium or the like and with the parts adjusted so that the scoop dumps a major portion of its picked up material outside the food supply holder;

Figure 2, a side elevation with portions broken away;

Figure 3, a view partly in transverse vertical section on the line 3—3 of Figure 2 showing a form of scoop in material receiving or picking up position (full lines) as it moves through the food supply in the holder and in discharging position (dotted lines);

Figure 4 is a transverse vertical section on the line 4—4 of Figure 2, showing means for retaining a removable hopper or food supply holder in operative relation to a scoop supported to rotate in a circular path through the hopper; and Figure 5 is a top plan view, on enlarged scale, of the form of scoop shown in Figure 1.

As shown in the drawings, a feeding device according to my invention includes a hopper or holder 10 for a supply of fish food, for example, in appropriate form and condition to be picked up in relatively small amounts by a scoop 11 and dumped into an aquarium or tank 12, or the like. Where this operation is to be repeated periodically or at controlled intervals, scoop 11 is conveniently mounted in such manner as to be actuated by a clock unit 13, or other suitable driving device for a spindle 14. Means are provided, as a clamp or set screw 15, Figure 3, whereby the clock unit is supported on the top edge of a wall of aquarium 12 so as to bring the food holder 10 in position above the interior of said aquarium when said holder and the clock unit are mounted in operative position thereon. As seen in Figures 2 and 5, scoop 11 is substantially trough-shaped and has a relatively wide outer end opening and a narrower inner end opening or channel, as 11a. The side walls of said scoop are relatively lower at their inner end portions adjacent to said channel 11a than at their mid-portions.

Scoop 11 is mounted at the outer or free end of shank 16 of a scoop carrying arm which is conveniently formed of spring wire and includes at its base a loop or coil spring 17 secured at its bight portion 18 to an outer end portion of spindle 14. As shown more clearly in Figures 1 and 2, coil 17 is positioned substantially at one side of the central longitudinal axis of spindle 14, and shank 16 and scoop 11 at the opposite side thereof. Also, Figure 2, the plane of the bottom wall of scoop 11 is offset from the longitudinal axis of shank 16.

Holder 10 is removably supported by any suitable means in operative relation to scoop 11 and the devices for moving and guiding the same. Thus, a bracket 19 and clips 20 are arranged so that a bottom portion of holder 10 rests on bracket 19 and portions of the upper edge of the rear wall of said holder are engaged by clips 20.

As indicated in the drawings, the scoop and its supporting arm (shown in full lines) normally move in a path in a substantially vertical plane during the scoop charging portion of their path of rotation through the holder. However, in another part of its cycle, the loaded scoop is deflected laterally out of said vertical plane path, as shown in dotted lines, Figures 1 and 3, so that it is brought into a position where its charge or its remaining contents are dumped outside of holder 10 beyond the outer side wall thereof. For this purpose, a suitable scoop deflecting device or cam may advantageously be in the form of an arm 21 mounted adjacent to spindle 14 and extending outwardly across the path of rotation of the scoop carrying arm. In the illustrated embodiment, shank 16 yieldingly engages and rides along the guiding or cam surface of arm 21 being biased toward said arm by spring 17. When scoop 11 reaches an appropriate discharge position (shown dotted in Figures 1 and 3, for example), discharge of the charge or load of food material or what remains thereof from scoop 11 is facilitated by slightly jolting or jarring the scoop. For this purpose, a notch 22, or equivalent means, is arranged adjacent the outer end of arm 21 and positioned to be engaged by an outer end portion of shank 16 as the latter reaches final discharge position in its cycle of rotation.

The illustrated embodiment also provides adjustable means for determining different amounts or volumes of food material to be discharged into the tank 12 with each recurring rotation of scoop 11, for example, a relatively small amount to supply the needs of a few fish or greater amounts for the requirements of larger numbers of fish. As seen in Fig. 2, arm 21 is supported on a carrier 26 eccentrically thereof which is mounted coaxially with spindle 14 and is angularly adjustable to bring the base of said cam arm 21 into and out of various operative camming positions in each of which said arm is in position to be engaged by shank 16 of the scoop carrying arm. Said scoop 11 is thus deflected by said arm 21 from its food receiving path into position to drop more or less of its content back into hopper 10 and then discharge the remainder into the tank 12, depending on the position of adjustment of said arm. Any suitable means may be employed to releasably hold the carrier 26 and hence arm 21 in any of various positions of angular adjustment, such, for example, as a screw 23 extending through a slot 24 and arranged and adapted to releasably hold carrier 26 at the several positions marked I, II, III and IV, respectively, Fig. 2.

When carrier 26, here shown as a slotted disc, is in "I" position, Figure 2, the scoop arm 16 comes into engagement with cam arm 21 later in its rotation cycle than is the case when said arm 21 is disposed in any of the other indicated positions of adjustment, as II to IV, inclusive. With scoop arm 16 engaging cam arm 21 when lodged at its IV position for example, the loaded scoop 11 is deflected early in the upper portion of its rotation cycle to follow a cam controlled path which causes the longitudinal axis of scoop 11 to incline outwardly at an increasing angle from the substantially vertical plane of its normal path through the holder 10. In this posture, the outer side wall of scoop 11 becomes increasingly a support at least for portions of the food material contents of the scoop. Thus, in the "I" position, of operative adjustment of arm 21, material picked up by scoop 11 is free to dribble back by gravity through said channel 11a into holder 10, as the scoop approaches a more nearly vertical position in its path of rotation and only a minor portion of the contents or charge is left to be discharged outboard. However, in the "IV" and other positions, the time and angular extent of dumping back or dribbling of the food material from scoop 11 are less than at I and the rate of loss or feed back from said scoop 11 is correspondingly reduced as the latter is moved toward its more deflected and more inclined positions (shown dotted Figs. 1 and 3), thus increasing the material retaining effect of portions of the outer front wall thereof or, in other words, conserving a greater portion of each scoopful of material for ultimate discharge outside the holder or into tank 12.

It will be apparent that the markings "I, II, III and IV" on face plate 25 may serve primarily as reference points and that adjustments of carrier 26 and arm 21 to intermediate or other positions than those so numbered may be made to meet different or special feeding requirements.

In operation, with the feeding device secured in position at the top edge of a wall of an aquarium, or the like, holder 10, carrying a supply of food material, is releasably engaged with and supported by clips 20 and bracket 19 as shown. The spindle 14 is rotated by the clock 13, or other driving means, whereby scoop 11 is moved repeatedly in a cycle first through its loading phase and then through its dumping phase. In the loading phase, spring 17 maintains scoop 11 in a rotation path through the food material which is substantially normal to the axis of spindle 14. As scoop 11 approaches its upper or dumping and discharge phase, it is deflected and inclined outwardly against yielding resistance of spring 17 by cam arm 21. When in final discharge position as shown in dotted lines, Figures 1 and 3 for example, a jolt or jarring effect is imparted to scoop 11 by notch 22 to facilitate discharge of its remaining contents. Scoop 11 then disengages the outer end of cam arm 21 and is returned to its normal loading path by spring 17, whereupon the cycle is repeated at any desired or suitable intervals.

What is claimed is:

1. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normally to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, the cam surface of said cam element including jolting means positioned adjacent to its outer end and which interrupts the normal cam contour thereof and is arranged and adapted to impart food material dislodging jolt to said scoop while the latter moves along said cam surface in a discharging portion of its cycle of rotation.

2. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, said cam being mounted on a movable cam carrier which is arranged and adapted for adjustment to bring the cam surface into and out of different scoop arm engaging and deflecting positions, and thereby to bring the scoop into different dumping positions in relation to the food holder and in which positions the scoop dumps different amounts of the picked up material back into the holder in that portion of its cycle of rotation during which said arm engages said cam.

3. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, said cam being mounted on a movable cam carrier which is arranged and adapted for adjustment to bring the cam surface into and out of different scoop arm engaging and deflecting positions, and thereby to bring the scoop into different dumping positions in relation to the food holder, the range of adjustment being such that a substantially predeterminable part of the scoop contents will be dumped back into the holder and the remainder will be dumped outside the holder.

4. In an automatic fish feeder of the type wherein a food receiving and discharging scoop is mounted to rotate through a holder for a supply of food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, said cam being provided adjacent its outer end with means arranged and adapted to impart a jolting effect to said shank and scoop when said shank is being moved across the cam surface thereby to dislodge food material from the scoop, said cam being mounted on a movable carrier adjustable to bring said jolting means on the cam into and out of different operative positions in relation to said holder.

5. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, said cam being mounted on a carrier which is angularly adjustable to vary the effective discharge position of the scoop whereby more or less picked up material is dislodged from the scoop depending upon the position of adjustment of said carrier.

6. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, said cam being mounted eccentrically on an angularly adjustable cam carrier and having a cam surface which extends outwardly therefrom across the path of rotation of said scoop arm.

7. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, means for effecting different positions of adjustment between said scoop and said cam whereby in one of said positions the scoop dumps a major portion of its picked up charge back into the holder and, at another of its positions, dumps a minor portion of said picked up material back into the holder and in any of said positions discharges the undumped portion of its contents outside the holder.

8. In an automatic fish feeder of the type wherein a food receiving and discharging scoop is mounted to rotate through a holder for a supply of food material to pick up at each rotation some of said food material from the supply, to transport picked up material to a discharging position outside the holder, and there to drop said picked up material all in a repeated cycle, the combination of an actuating shaft and resilient scoop-carrying means moved by and with rotation of said shaft and arranged and adapted to rotate said scoop in a generally circular path partly through said holder to pick up food material and partly outside said holder to discharge food material, said path being in part generally normal to the shaft axis and in part extending in a direction outwardly toward said discharge position, said means including a resilient coil having a loop portion rigidly secured at one side of said shaft axis, a shank carried by said coil and extending beyond the opposite side of said shaft in a radial direction from said axis, said scoop being secured at the outer end of said shank, said resilient coil having a portion secured to the inner end of said shank whereby scoop moving force is transmitted to said shank and said scoop from said shaft by and through said coil, a cam positioned and adapted to provide a cam surface extending across the path of rotation of the shank in a path above said shaft thereby to engage said shank and deflect the scoop axially to food discharging position outside of said holder, said cam being provided adjacent its outer end with means arranged and adapted to impart a jolting effect to said shank and scoop when said shank is being moved across the cam surface thereby to dislodge food material from the scoop.

References Cited in the file of this patent
UNITED STATES PATENTS

| | | |
|---|---|---|
| 1,639,564 | Huber | Aug. 16, 1927 |
| 1,828,117 | Mallinckrodt | Oct. 20, 1931 |
| 2,808,808 | Roben | Oct. 8, 1957 |
| 2,847,066 | Kleiber et al. | Aug. 12, 1958 |